United States Patent [19]
Merchant et al.

[11] Patent Number: 5,973,898
[45] Date of Patent: Oct. 26, 1999

[54] DETECTOR CIRCUIT AND AUTOMATIC ELECTRICAL INTERRUPT APPARATUS

[76] Inventors: Roger R. Merchant, 811 - 9th St., St. Paul, Nebr. 68873; William J. Bjorklund, R.R. 1, Box 143, Greeley, Nebr. 68842

[21] Appl. No.: 09/008,520

[22] Filed: Jan. 16, 1998

[51] Int. Cl.⁶ ...................................................... H02H 9/00
[52] U.S. Cl. .............................. 361/56; 361/111; 361/115; 361/118
[58] Field of Search ............................... 361/56, 111, 113, 361/115, 117, 118, 119

[56] References Cited

U.S. PATENT DOCUMENTS

| | | | |
|---|---|---|---|
| 4,276,576 | 6/1981 | Uman et al. | 361/1 |
| 4,823,115 | 4/1989 | McCallie | 340/601 |

*Primary Examiner*—Stephen W. Jackson
*Attorney, Agent, or Firm*—Koley, Jessen, Daubman & Rupiper, P.C.; Mark D. Frederiksen

[57] ABSTRACT

The detector for a ground potential rise event includes a first transistor with a first antenna connected to the base collector junction of the transistor, and a second antenna connected to the transistor such that any imbalance of electrostatic charge density existing in the antenna is equalized across the base collector junction of the first transistor. The first and second antennae are vertically polarized, with the second antenna extending downwardly into contact with the ground surface. A second transistor is connected to the first transistor to form an oscillator circuit with the second transistor connected as a reverse biased avalanche transistor to momentarily discharge a capacitor. A transmitter is connected to a power supply and a relay and to the second transistor, to periodically transmit a signal upon closing of the relay by virtue of oscillation of the oscillator circuit. A receiver physically separated from the transmitter receives the signal and includes a interrupt circuit which will interrupt an electrical conductor upon the receipt of the signal from the transmitter, by opening a switch in a relay in the electrical conductor. A timer circuit is provided between the receiver and relay to maintain the relay in the open "interrupt" condition for a predetermined period of time upon receipt of a signal from the transmitter.

14 Claims, 3 Drawing Sheets

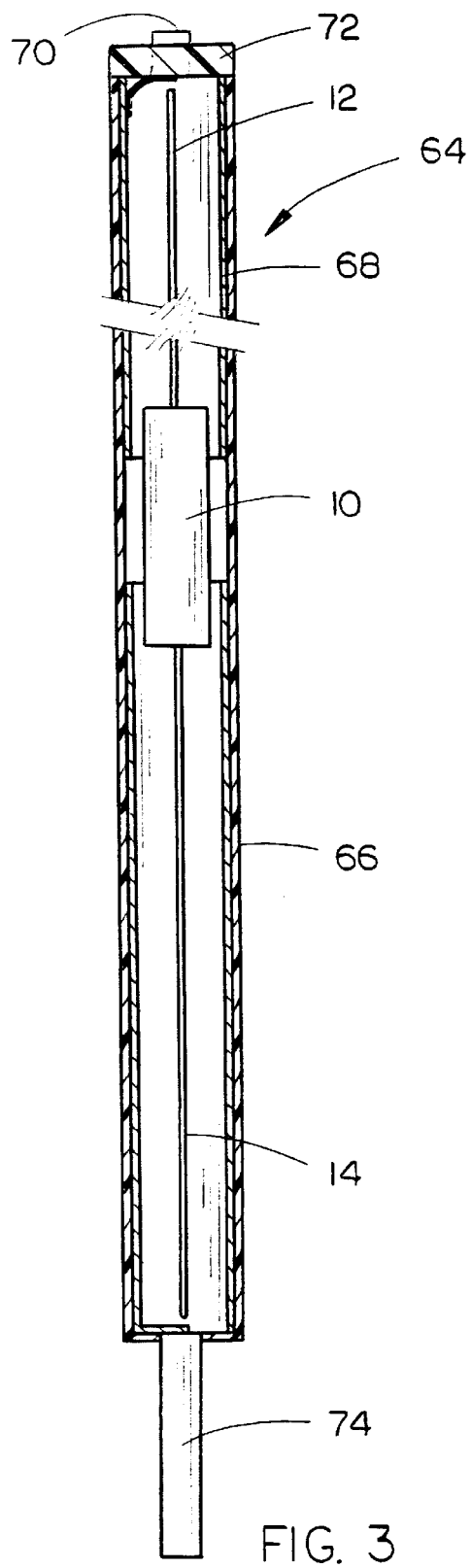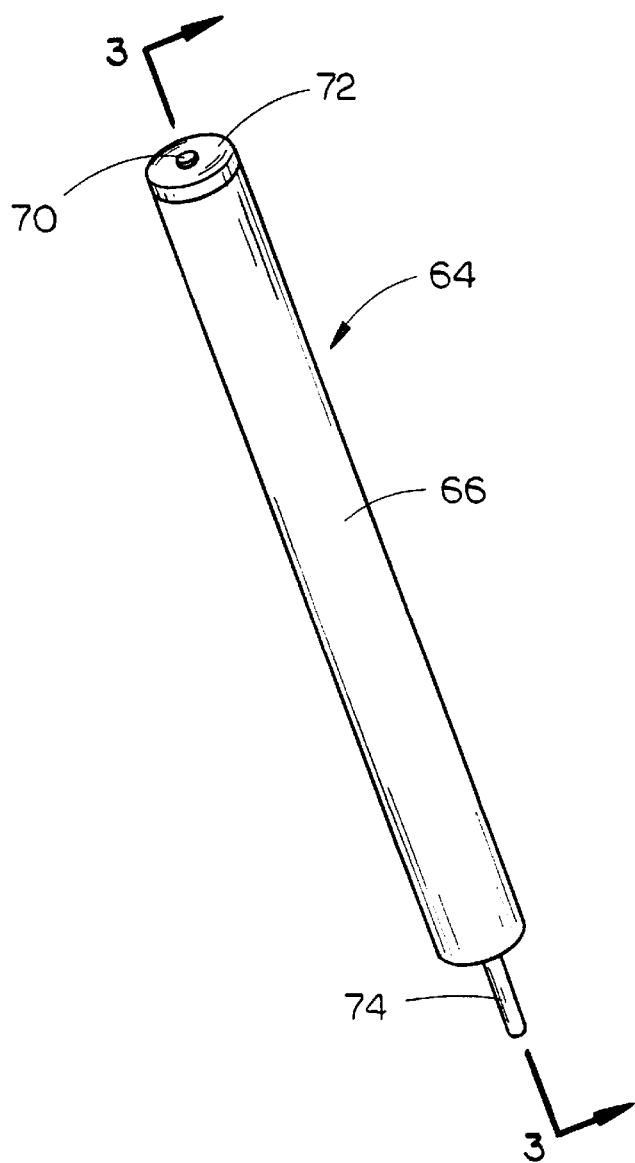
FIG. 3
FIG. 2

DETECTOR CIRCUIT AND AUTOMATIC ELECTRICAL INTERRUPT APPARATUS

TECHNICAL FIELD

The present invention relates generally to electrical surge suppression devices, and more particularly to an improved electrical interrupt apparatus which automatically opens electrical circuits to protect equipment upon detection of a ground potential rise.

BACKGROUND OF THE INVENTION

In recent years a new problem has been identified in the field of surge suppression, which is a conditional commonly known as "ground potential rise" (hereinafter GPR). Ground potential rise (GPR) is described as a sudden rise of electrical potential in a specific region of the earth as a result of an exposure of that area to a high potential electrical charge, whether created by natural causes such as lightning strikes or by artificial means, such as high power lines coming into contact with the earth. With these types of occurrences, an area of the earth's surface, typically having a diameter of at least 1,000 feet from the epicenter of the imparted charge, becomes highly energized by the electrical potential. AT the moment the GPR event begins to take place, an electrical wave is radiated out from the point of the disturbance (the epicenter) in every direction. In the case of a lightning ground strike, a high current and high voltage field is then propagated outwardly from the strike point. If the GPR induced surge encounters a grounded metallic object, such as a ground rod or a buried metallic cable, a portion of the surge is then induced into that conductor. Ground loops which commonly occur in electrical power networks and especially in telecommunications are effected by the voltages and currents which develop as a result of the potential differences existing between multiple grounding points.

When such a ground loop is present, excessive currents in the circuit can cause damage to the circuit. This condition can cause severe damage to electronic equipment that is electrically connected to such circuits.

Standard practices of surge management and suppression call for a surge suppression network which attempts to shunt a surge event to ground. However, if the surge event has originated in the ground, it will then tend to flow from that point into the electrical and communication wiring and thence back through the circuit without being suppressed. All known forms of surge suppression technology attempt to clamp a surge event to ground, and therefore are helpless to cope with a surge event that originates within the earth/ground. This is because the earth is already saturated with a high potential charge that is "looking" for a return path to the atmosphere or any area where the electrical potential is less than the area where the GPR event is the strongest.

SUMMARY OF THE INVENTION

It is therefore a principal object of the present invention to provide an improved electrical interrupt apparatus which senses a GPR.

A further object is to provide an electrical interrupt apparatus which detects a GPR condition and relays the information to a physical disconnect system.

Still another object of the present invention is to provide an electrical interrupt apparatus which totally isolates electrical equipment from external electrical connections, signal connections, and earth/ground connections during a GPR event.

Still another object is to provide an electrical interrupt apparatus which monitors the presence of a GPR event while maintaining electrical isolation of electronic equipment, and reconnects the equipment after the threat of the GPR event has passed.

These and other objects of the present invention will be apparent to those skilled in the art.

A detector for a ground potential rise event includes a first transistor with a first antenna connected to the base collector junction of the transistor, and a second antenna connected to the transistor such that any imbalance of electrostatic charge density existing in the antenna is equalized across the base collector junction of the first transistor. The first and second antennae are vertically polarized, with the second antenna extending downwardly into contact with the ground surface. A second transistor is connected to the first transistor to form an oscillator circuit with the second transistor connected as a reverse biased avalanche transistor to momentarily discharge a capacitor. A transmitter is connected to a power supply and a relay and to the second transistor, to periodically transmit a signal upon closing of the relay by virtue of oscillation of the oscillator circuit. A receiver physically separated from the transmitter receives the signal and includes a interrupt circuit which will interrupt an electrical conductor upon the receipt of the signal from the transmitter, by opening a switch in a relay in the electrical conductor. A timer circuit is provided between the receiver and relay to maintain the relay in the open "interrupt" condition for a predetermined period of time upon receipt of a signal from the transmitter.

BRIEF DESCRIPTION OF THE DRAWINGS

FIG. 2 is a perspective view of the detector assembly housing utilized in an outdoor environment;

FIG. 3 is a sectional view taken at lines 3—3 in FIG. 2; and

DESCRIPTION OF THE PREFERRED EMBODIMENT

Figure 1:
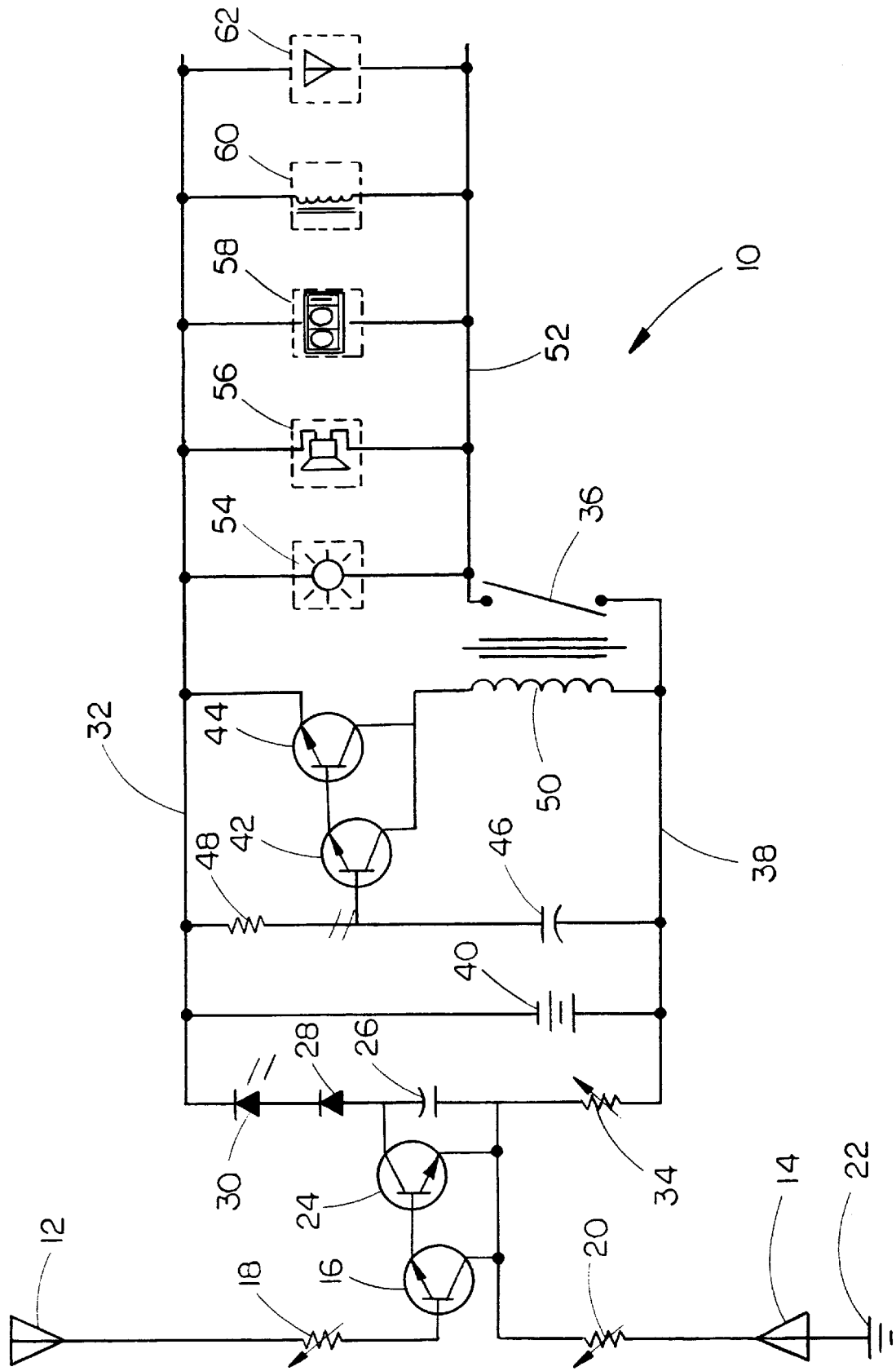
FIG. 1 is an electrical schematic diagram of a ground potential rise detector circuit.

Referring now to the drawings, in which similar or corresponding parts are identified with the same reference numeral, and more particularly to FIG. 1, the detector circuit of the present invention is designated generally at 10, and is utilized to detect a ground potential rise, and transmit an electrical signal in response to the detection of the GPR event.

A pair of whip antennas 12 and 14 are electrically connected to a transistor 16 through variable resistors 18 and 20, respectively, with upper antenna 12 connected to the base junction, and lower antenna 14 connected to the collector of transistor 16. In the preferred embodiment of the invention, antennas 12 and 14 are 31 inch stainless steel whip antennas, and resistors 18 and 20 are 10 M. Ohm variable resistors. It may be desirable to add an earth ground connection 22, and this is indicated by the broken line to the earth ground 22, off of whip antenna 14.

A second transistor 24 is connected at its base junction to the emitter of transistor 16 and at its collector to whip antenna 14, and is operably connected to turn on only after transistor 16 turns on. A capacitor 26 is connected between whip antenna 14 and the emitter of second transistor 24, so as to discharge when second transistor 24 turns on.

A biasing diode 28 is connected between second transistor 24 and capacitor 26, on the cathode side of capacitor 26. A light emitting diode 30 is connected downstream of biased diode 28 and thence to conductor 32. The anode side of capacitor 26 is connected through variable resistor 34 to one terminal of a switch 36 via conductor 38. A 9-volt battery 40 is connected between conductors 32 and 38 to selectively supply power to circuit 10.

Transistors 42 and 44 are formed together in a Darlington arrangement, and electrically connected between conductors 32 and 38, in communication with LED 30 to form an optic coupler package. As the light falls on the base junction of transistor 42, the transistor turns on, discharging capacitor 46, connected between the base of transistor 42 and conductor 38. This will also turn on transistor 44. A resistor 48 connected between conductor 32 and the base of transistor 42, works in conjunction with capacitor 46 to determine the "on" time of relay coil 50, connected between the collectors of transistors 42 and 44, and conductor 38. Relay coil 50 is positioned and operable to turn on switch 36 when the relay coil 50 is energized, thereby closing the electrical connections of switch 36 to electrically connect conductor 38 with conductor 52, on the other terminal of switch 36.

A variety of devices may be connected between conductors 32 and 52, for selective activation by the detector circuit. FIG. 1 discloses five examples as follows: (1) a lamp or other auxiliary light 54, (2) a warning buzzer 56, (3) an event counter 58, (4) a solenoid or motor 60, and/or (5) a low power radio frequency transmitter 62.

In operation, the electrostatic charge from a lightning ground strike will travel across the surface of the earth, and the charge voltage will collect on the lower whip antenna 14 and travel up to the upper whip antenna 12. As the voltage travels across the base junction of the first transistor 16, transistor 16 is momentarily turned on. Transistor 16 is turned on only for as long as the undulating electrostatic disturbance, produced by the actual lightning strike, travels up and down with antennas 14 and 12.

It should be noted that transistor 16 is not used in the conventional sense of the transistor. Transistor circuits always require a negative or positive bias voltage on the base junction of the transistor. However, in this circuit 10, no bias voltage is being applied to the base junction. Only the upper whip antenna 12 is connected to the base junction of the transistor. Thus, transistor 16 acts as a switch which controls the rest of the circuit.

Transistors 16 and 24 are connected to form an oscillator circuit. Although transistor 16 could be eliminated, the overall sensitivity of the detector would be reduced by a factor of 50%.

As transistor 16 turns on, so does transistor 24, which thereby discharges capacitor 26. As capacitor 26 recharges, light omitting diode 30 will glow or emit a light signal. Thus, transistors 16 and 24 form an oscillator circuit, and light omitting diode 30 will pulse on and off in response thereto. Speed of the oscillation is a function of the resistance of the base collector junction of transistor 16, and the value of capacitor 26.

Operation of detector circuit 10 can be verified by shorting the two whip antennas 12 and 14 together. This lowers the resistance of the base collector junction of transistor 16, and the oscillation begins.

During the times that no signal is received, circuit 10 draws no power from battery 40. However, when transistors 16 and 24 detect a signal, and oscillate, current will flow through variable resistor 34 to thereby charge up capacitor 26, and thence flow through bias diode 28 and LED 30. As noted above, transistors 42 and 44 work in combination with LED 30, so that as light falls on the base junction of transistor 42, the transistor 42 turns on and discharges capacitor 46 and turns on transistor 44. This in turn turns on relay coil 50 so as to close switch 36 and supply power from battery 40 to devices 54, 56, 58, 60 and 62.

Devices 54, 56, 58, 60 and 62 are merely examples of a variety of devices that could be operated by the detector circuit. If detector circuit 10 is utilized indoors, LED 30 could be used for a visual indication of a GPR event, and/or a buzzer 56 could be employed to provide an audible indication of the approach of a storm. As noted above, additional lights 54, event counters 58, solenoids or motors 60, could also be connected to the circuit and operated upon the approach of a storm.

Figure 4:
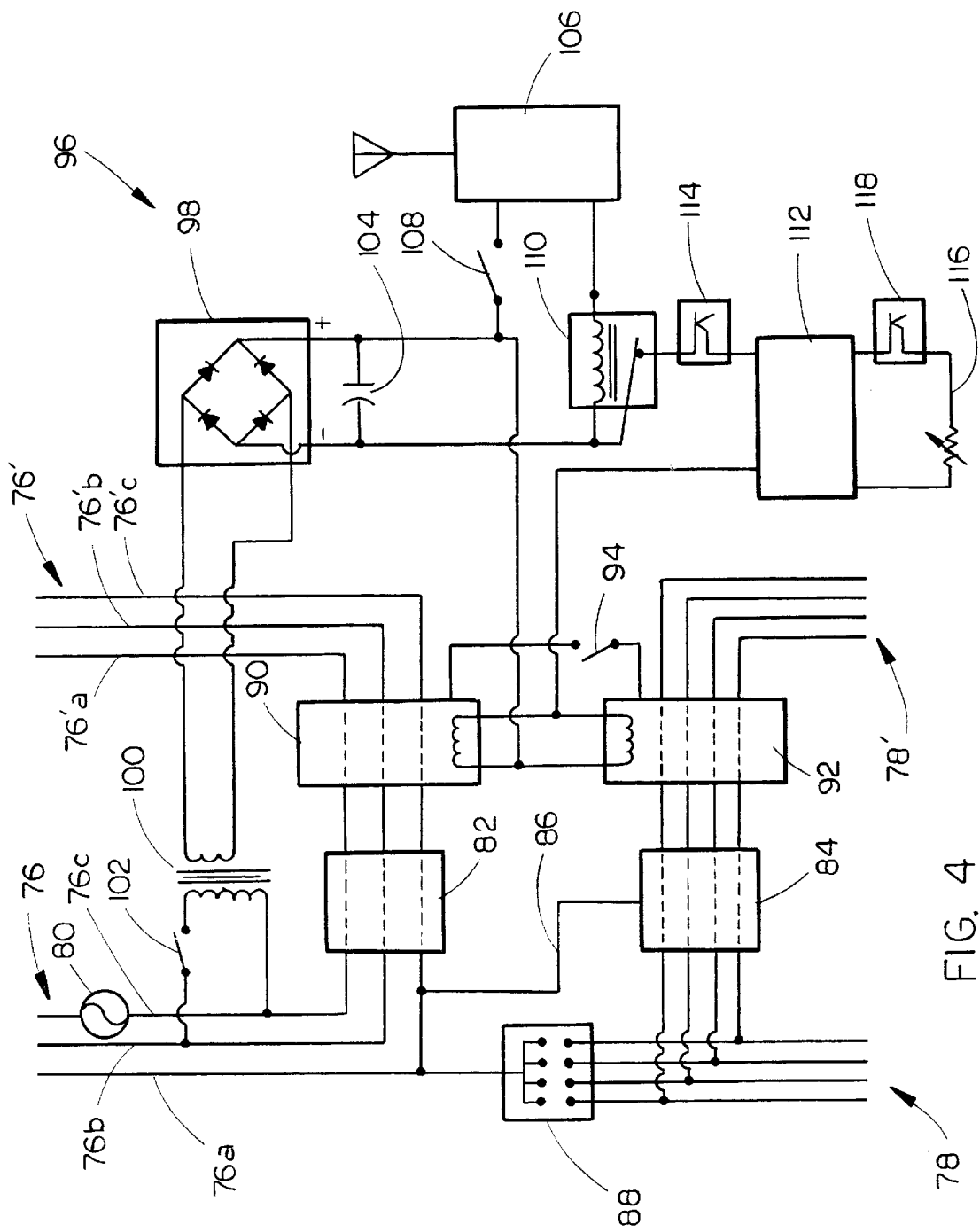
FIG. 4 is an electrical schematic diagram of a receiver and interrupt circuit.

In the apparatus for protection of electrical and electronic equipment, the detector circuit 10 employees a low power radio frequency transmitter 62 which sends out a coded signal to a matching receiver (shown in FIG. 4). The receiver then could be utilized to interrupt or otherwise disconnect an electrical device from its power source, to protect the device from electrical surges.

Referring now to FIGS. 2 and 3, a housing assembly 64 is shown which houses the detector circuit 10, to protect the circuit from weather. Housing 64 is preferably a hollow plastic tube 66 with detector circuit 10 mounted within the interior thereof. The upper half of the interior surface of tube 66 is lined with an electrostatic conducting material 68. Liner 68 is in electrical communication with a metallic bleed-off button 70 mounted through an upper cap 72 in tube 66. Bleed-off button 70 is necessary to bleed-off static energy to ensure proper and continual operation of the detector circuit 10 during a thunderstorm. The lower half of the interior surface of tube 66 is also lined with conductive material 68' and connected to ground rod 74. Liner 68' is electrically separated from liner 68, as shown in FIG. 3.

A short ground rod 74 is attached to the lower end of tube 66 and is connected to lower whip antenna 14. In operation, housing assembly 64 may be hung or supported either above ground, or the lower half may be buried in the earth. This permits ground rod 74 to communicate directly with the earth's surface and would allow for maximum detection distance. The sensitivity of the detector circuit 10 can be controlled in a variety of ways. The length of whip antennas 12 and 14 may be adjusted, the series resistance may be adjusted (see FIG. 1), and/or the height of the housing assembly 64 with respect to the surface of the earth may be adjusted. In any event, lower whip antenna 14 should be in communication with the surface of the earth to monitor and collect the static charges of a GPR event. It has been found that a detector circuit 10 with twin 31 inch whip antennas 12 and 14 mounted in a vertical plane and positioned approximately one foot off of the surface of the ground (thereby placing nearing 20 inches of lower whip antenna 14 in contact with the surface of the ground), will allow the detector circuit 10 to sense cloud to ground lightning discharges at an approximate distance of 30 miles. This detector circuit 10 will not respond to cloud to cloud lightning discharges, nor is it designed to respond to manmade radio frequencies. The detector circuit 10 can be utilized either indoors or outdoors, with the outer weather protective housing assembly 64 being utilized in outdoor environments.

Referring now to FIG. 4, a receiver and interrupt circuit is disclosed for receiving a signal from detector circuit 10 (of FIGS. 1 and 3) to physically interrupt/disconnect an electrical device from a power line 76 and/or telecommunications line 78.

Power line 76 is a conventional AC power line, having a safety ground wire 76a, a neutral wire 76b, and a "hot" wire 76c. A fuse 80 is conventionally installed on typical AC power line hot wires 76c. Box 82 represents a conventional passive surge connector of the prior art, typically utilizing metal oxide varistors, gas discharge tubes, or ZNRs. Similarly, box 84 is a conventional surge protection device for telecommunication lines, which shunts surge voltages to safety ground wire 76a via conductor 86. A spark gap 88 is also a conventional device, typically part of a PC board, representing a conventional passive surge protection element, and is connected between telecommunications line 78 and safety ground wire 76a.

After passing through box 82, power line 76 is fed to a relay 90. When relay 90 is "on" the wires 76a, 76b, and 76c are electrically connected to the output power line wires 76'a, 76'b, and 76'c, which form the output power line 76' to the electrical device to be protected. Similarly, relay 92 will connect the various wires of telecommunication line 78 to the output telecommunication line 78' when relay 92 is "on". Relays 90 and 92 operate at the same time, since their field windings are connected together in parallel.

When relays 90 and 92 are "off" the output wires 76'a, 76'b, 76'c and output wires 78' are connected together in crowbar fashion, and are isolated from power line 76, telecommunication line 78, as well as passive surge protectors 82 and 84. This crowbar protection guards the protected output, in the event of arc-over within the relays 90 and 92. This electrical isolation also prevents the protected lines 76' and 78' from becoming part of ground loop during a ground potential rise event. A switch 94 connected between relays 90 and 92 is operable to permit the consumer to select or deselect this "crowbar" protection.

Relays 90 and 92 are selectively operated by a receiver/interrupt circuit designated generally at 96 in FIG. 4. Power is supplied to relays 90 and 92 via a full wave bridge rectifier 98 which is supplied power through step-down transformer 100, connected to neutral wire 76b and hot wire 76c, in a conventional fashion. A master switch 102 selectively connects and disconnects the power supply. A capacitor 104, connected between the output leads of rectifier 98, filters the DC output voltage of rectifier 98.

Positive voltage from rectifier 98 is applied to receiver 106 through switch 108. Switch 108 thereby permits the user to manually select and/or deselect the use of the lightning detector of FIG. 1. The negative output of receiver 106 is connected through the field winding of a relay 110, and then back to the negative output of the rectifier.

Positive voltage from rectifier 98 is also applied to the field windings of relays 90 and 92, and thence through a timer integrated circuit 112. The negative source for timer 112 is connected through an auxiliary jack 114, and thence to the normally closed contacts of relay 110, and then back to the negative output of rectifier 98. Timer circuit 112 is a "delay on" timer, with the delay time being adjusted by variable resistor 116. Resistor 116 is in series with an auxiliary jack 118, as shown in FIG. 4.

Auxiliary jack 114 is designed for connection to additional equipment, such as an over/under voltage monitor. Auxiliary jack 118 is available for other methods of controlling the delay on time, such as using a thermistor-varistor sensor to track "off time" with ambient temperature. During a momentary power loss, the timer keeps power off for the amount of time, set by resistor 116. This helps prevent damage to equipment, as it keeps power from the equipment until the surges on the AC line have minimized themselves, and until full line voltage is available. This would also reduce the peak load demand of a user upon the start-up from a power loss or brownout. Additional devices may be slaved from the switched output line 76'.

In use, the detector circuit 10 is placed either indoors or outdoors, with the lower whip antenna 14 in contact with the ground. Preferably, whip antennas 12 and 14 are vertically polarized, to provide best operation. The detector circuit (as shown in FIG. 1) employs a low power radio frequency transmitter 62, which will send out a coded signal to receiver 106 (shown in FIG. 4), upon detection of a GPR event. Assuming that master switch 102 and switch 108 are both closed, such that receiver/interrupt circuit 96 is activated, the coded signal will be received by receiver 106, and operate relays 90 and 92 to disconnect output power line 76' and output telecommunications line 78'. Timer circuit 112 holds relays 90 and 92 in the "disconnect" state for a predetermined period of time. If additional GPR events are detected and transmitted to receiver 106, this time period will be restarted. In this way, power to the electrical device is interrupted during potentially damaging GPR events, and thence reconnected after the threat has passed.

Whereas the invention has been shown and described in connection with the preferred embodiment thereof, many modifications, substitutions and additions may be made which are within the intended broad scope of the appended claims.

We claim:

1. A ground potential rise detector comprising:
   a first antenna connected to a first transistor at a base junction of the transistor;
   a second antenna connected to the first transistor at a collector terminal such that any imbalance of electrostatic charge density existing in the antenna is equalized across the base-collector junction of the first transistor;
   said first and second antennae being vertically polarized;
   a second transistor connected at its base junction to an emitter terminal of the first transistor; and
   a capacitor connected between the collector and emitter of the second transistor;
   said first and second transistors arranged to form an oscillator circuit with the second transistor connected as a reverse biased avalanche transistor to momentarily discharge the capacitor.

2. The detector of claim 1, wherein said oscillator circuit is connected to a power supply, a relay and a transmitter, to periodically close the relay and activate the transmitter upon detection of a ground potential rise event.

3. The detector of claim 1, wherein said first transistor is spaced above the ground surface a predetermined distance, to provide a predetermined sensitivity to the detector.

4. The detector of claim 1, further comprising:
   an enclosed housing, with said antennae and first transistor mounted within the housing; and
   a ground rod on a lower end of the housing and in electrical contact with the second antenna, said ground rod also in contact with a ground surface.

5. The detector of claim 2, further comprising a receiver/interrupt circuit spaced physically remotely from the transmitter, comprising;
   a receiver for receiving signals from the transmitter;
   a relay connected to the receiver and operable to open a normally-closed switch in at least one conductor upon receipt of a signal by the receiver from the transmitter.

6. The detector of claim 5, further comprising a timer circuit connected between the receiver and relay, for maintaining the "open" condition of the relay for a predetermined period of time after the occurrence of receipt of a signal by the receiver.

7. A ground potential rise detector comprising:

a first antenna connected to a first transistor at a base junction of the transistor;

a second antenna connected to the first transistor at a collector terminal such that any imbalance of electrostatic charge density existing in the antenna is equalized across the base-collector junction of the first transistor;

an enclosed housing, with said antennae and first transistor mounted within the housing; and a ground rod on a lower end of the housing and in electrical contact with the second antenna, said ground rod also in contact with a ground surface;

said housing being an elongated, vertically oriented tube with a lower half of the tube being buried in the ground.

8. The detector of claim 7, wherein said tube further includes:

an electrically conductive drain button mounted in an upper end of the tube; and a lining of electrically conductive material formed on an inner surface of the upper half of the tube, electrically connected to the drain button.

9. The detector of claim 8, further comprising a lining of electrically conductive material formed on an inner surface of the lower half of the tube, electrically connected to the ground rod, and electrically separated from the lining in the upper half of the tube.

10. A ground potential rise detector comprising:

a pair of vertically polarized first and second antennae;

the first antenna connected to a first transistor at a base junction of the transistor and extending vertically upwardly therefrom;

the second antenna connected to the first transistor at a collector terminal and extending vertically downwardly therefrom, such that any imbalance of electrostatic charge density existing in the antenna is equalized across the base-collector junction of the first transistor;

a second transistor connected at its base junction to an emitter terminal of the first transistor; and a capacitor connected between the collector and emitter of the second transistor;

said first and second transistors arranged to form an oscillator circuit with the second transistor connected as a reverse biased avalanche transistor to momentarily discharge the capacitor.

11. The detector of claim 10, wherein said first transistor is spaced above the ground surface a predetermined distance, to provide a predetermined sensitivity to the detector.

12. The detector claim 10, wherein said oscillator circuit is connected to a power supply, a relay and a transmitter, to periodically close the relay and activate the transmitter upon detection of a ground potential rise event.

13. The detector of claim 12, further comprising a receiver/interrupt circuit spaced physically remotely from the transmitter, comprising;

a receiver for receiving signals from the transmitter;

a relay connected to the receiver and operable to open a normally-closed switch in at least one conductor upon receipt of a signal by the receiver from the transmitter.

14. The detector of claim 10, further comprising a timer circuit connected between the receiver and relay, for maintaining the "open" condition of the relay for a predetermined period of time after the occurrence of receipt of a signal by the receiver.

* * * * *